(No Model.)

D. J. CABLE.
ELECTRIC INDICATOR FOR STEAM BOILERS.

No. 246,718. Patented Sept. 6, 1881.

WITNESSES
Wm A. Skinkly
Jos. S. Latimer

INVENTOR
Daniel J. Cable
By his Attorneys
Baldwin, Hopkins, & Peyton

UNITED STATES PATENT OFFICE.

DANIEL J. CABLE, OF PITTSBURG, PENNSYLVANIA.

ELECTRIC INDICATOR FOR STEAM-BOILERS.

SPECIFICATION forming part of Letters Patent No. 246,718, dated September 6, 1881.

Application filed June 1, 1881. (No model.)

*To all whom it may concern:*

Be it known that I, DANIEL J. CABLE, of Pittsburg, in the county of Allegheny and State of Pennsylvania, have invented certain new and useful Improvements in Magneto-Electric Indicators for Steam-Boilers, of which the following is a specification, reference being had to the accompanying drawings.

The object of my invention is to improve that class of indicators for automatically giving notice of the quantity of water in a boiler in which a float is placed upon the surface of the water within the boiler, which, rising and falling, operates certain mechanism serving to give notice of the position of the water-line in the boiler, which improvements I will now proceed to describe in detail by reference to the letters on the accompanying drawings, in which—

Figure 1:
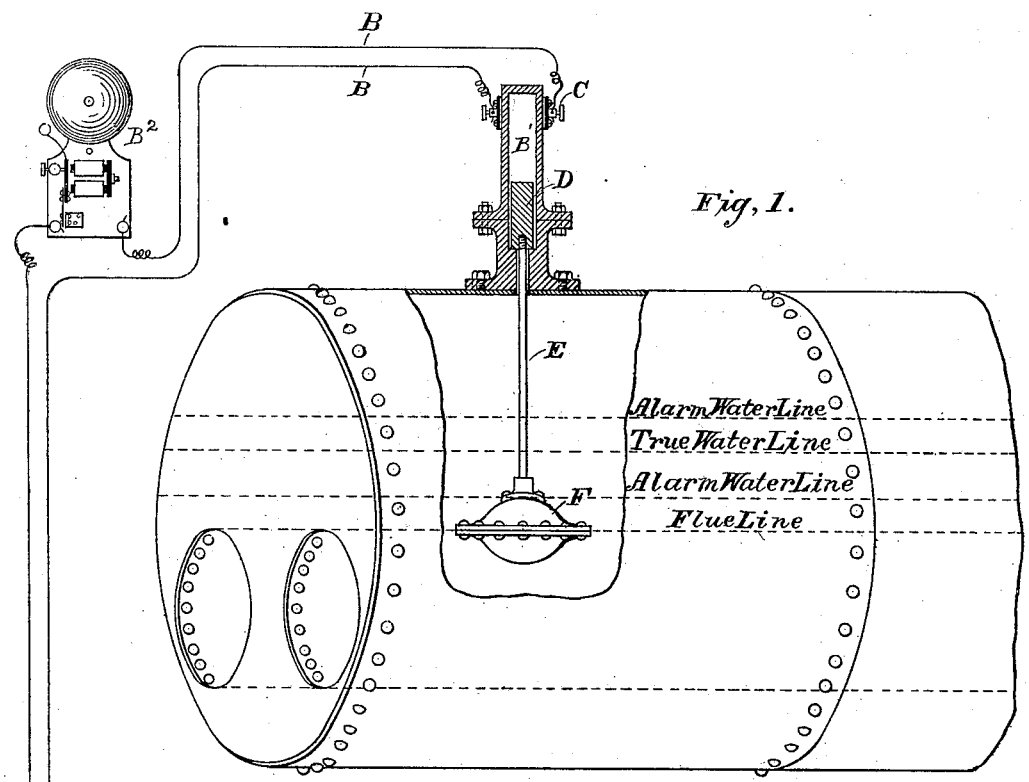
Figure 2:
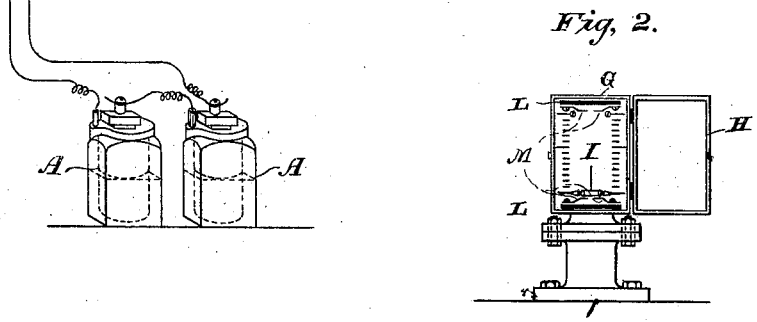
Figure 3:
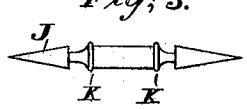

Figure 1 is an elevation of a portion of a steam-boiler, partly in section, with my improvements attached. Fig. 2 is an elevation of a detached portion of the gage or indicator, and Fig. 3 an enlarged view of a detached index or pointer which I employ.

A indicates an ordinary simple battery, having wires B B running from it to a cylinder, B', secured to the top of the boiler. One of these wires is connected to an electric-alarm-bell mechanism, B², which may be located in the office of a factory or machine-shop, or in any other conspicuous place where it may be useful to having a sounding-alarm station.

C C indicate the opposite terminals of the wires connected with the cylinder B'.

D indicates a permanent magnet within the cylinder B', connected by a rod, E, to a float, F, within the boiler. Upon one side of the cylinder B', in a position for convenient view of the engineer, I place a case, G, having a graduated plate or surface, I, for indicating low water, high water, and the proper quantity of water in the boiler. This case is provided with a glass door, H, and within it is the loose or free soft-iron double pointer or index J, provided with rolling-surfaces K K, which, as the pointer is very light, enables it to be rolled up and down over the graduated surface I by the exertion of slight force, and is not pivoted, as is usual.

The operation of these parts is as follows: As the float rises and falls within the boiler when the water-supply is increased or diminished the magnet will reciprocate within the cylinder, and by its attractive force will cause the index to rise and fall within its case, while its position may be observed through the glass door by the engineer. At the top of the case is a long mark on each side, which, when the index rises to it, indicates an excess of water in the boiler, and at the bottom are similar long marks, which, when the index descends to them, indicate too little water in the boiler. Both these extremes mark the danger-points, and the intermediate marks serve to give warning to the engineer of the approach to the danger-marks. At both these danger-marks, above and below, I provide insulated metallic connections with the battery-wires B B in the path of the index J, so that when it reaches these points it not only gives warning to the engineer, but also completes the electrical circuit and causes an alarm to be sounded upon the alarm-bell, so that I provide for two unfailing simple automatic alarms to be simultaneously given at different places where they are most likely to be needed.

I show in Fig. 2 insulating material L, to which are secured spring-conductors M, in contact with which, to make electrical connection, the index comes when arriving at either danger-point; but I do not confine myself to any particular manner of effecting the electrical connection by means of the index, as any ordinary method will answer the purpose.

My invention is applicable economically to all classes of steam-boilers as an alarm attachment or indicator, and, although not liable to get out of order or require repairs, is readily detachable for repairs should occasion require.

I am aware that the employment of floats within steam-boilers for operating indicators by means of magnets and electrical apparatus is not broadly new, and my invention is designed to overcome the defects heretofore existing in such devices, and to produce a simple, economical, and perfectly-reliable indicator, which shall always automatically and simultaneously give notice in two places of the dangerous position of the water-line in a boiler, whether on account of too little or too much water.

Having thus described my invention, what

I claim as new, and desire to secure by Letters Patent, is—

1. The graduated indicator-case G, provided with a glass door and with a loose or free index, J, substantially as and for the purpose specified.

2. The graduated indicator-case G, provided with a glass door and with insulated electrical terminals, and a loose or free index-pointer, J, substantially as and for the purpose described.

3. The loose or free index J, provided with rolling-surfaces K K, substantially as described.

4. The combination of the cylinder, the float, and the magnet with the graduated indicator-case G, carrying the loose or free index J, substantially as and for the purpose described.

5. The combination of the cylinder, the float, the magnet, the graduated indicator-case G, carrying the loose or free index J, and the battery-wires, battery, and alarm-bell, substantially as described, whereby two indications are simultaneously given, as and for the purpose set forth.

In testimony whereof I have hereunto subscribed my name this 28th day of May, A. D. 1881.

DANIEL J. CABLE.

Witnesses:
MARCUS S. HOPKINS,
ST. CLAIR ORMSBY.